INVENTOR
G. P. WENNEMER
BY
S. E. Hollander
ATTORNEY

Oct. 18, 1960 G. P. WENNEMER 2,957,047

AUTOMATIC TELEPHONE SYSTEM

Filed Dec. 5, 1958 4 Sheets-Sheet 2

INVENTOR
G. P. WENNEMER
BY S.E. Hollander
ATTORNEY

Oct. 18, 1960 G. P. WENNEMER 2,957,047

AUTOMATIC TELEPHONE SYSTEM

Filed Dec. 5, 1958 4 Sheets-Sheet 3

INVENTOR
G. P. WENNEMER

BY S.E. Hollander

ATTORNEY

AUTOMATIC TELEPHONE SYSTEM

Filed Dec. 5, 1958

INVENTOR
G. P. WENNEMER
BY S.E. Hollander
ATTORNEY

United States Patent Office 2,957,047 Patented Oct. 18, 1960

2,957,047

AUTOMATIC TELEPHONE SYSTEM

Gerard P. Wennemer, Fairmount, N.J., assignor to Bell Telephone Laboratories, Incorporated, New York, N.Y., a corporation of New York Filed Dec. 5, 1958, Ser. No. 778,492

14 Claims. (Cl. 179—18)

This invention relates to automatic telephone systems and more particularly to a telephone system wherein connection to a wanted party within the network is effected although the called party alters his physical location.

Heretofore, when a subscriber moved from one physical location to another, it was incumbent upon him to advise would-be callers of the directory number of the telephone substation at his new location. In addition to the inconvenience entailed in the relatively infrequent instances in which subscribers actually transfer their permanent residence locations, the necessity of advising callers becomes unusually burdensome in those instance where frequent transient relocations are effected.

In the case of professional individuals whose employment dictates repeated peregrinations throughout the period of a day, the situation is particularly onerous. With regard to a doctor, for example, whose physical presence varies from his office location to a hospital environment and to rounds of the homes of his patients, effecting a telephone connection to the doctor is often a difficult problem.

It is therefore an object of this invention to provide a telephone system wherein a connection to a called party is effected by dialing a single permanent identity number assigned to the called party, although the called party may frequently alter his physical location.

A further object of this invention is to permit a subscriber to transmit intelligence relative to a change in physical location corresponding to a telephone directory number to a central memory store.

An additional object of this invention is to automatically route calls to a called subscriber independent of the frequency of his physical relocation, in instances where the calling party has no information concerning the physical location of the called subscriber.

Another object of this invention is to permit facile alteration of a code location designation relating to a telephone substation number at which a subscriber may be contacted.

A further object of this invention is to permit a subscriber to transmit intelligence from any telephone substation to a central memory store relative to the number of a substation at which he may be currently contacted.

Another object of this invention is to permit a telephone subscriber to be assigned a permanent identity number not necessarily indicative of any telephone substation but personal to the subscriber himself whereby dialing of the permanent identity number will automatically effect a connection to the subscriber wherever he is situated.

Still another object of this invention is to provide a central storage memory facility wherein all the permanent identity numbers of subscribers in a given central office may be recorded.

A further object of this invention is to provide a corresponding location code number storage indicative of telephone substations at which each subscribed having a permanent identity number may be currently contacted.

A still further object of this invention is to permit each subscriber to retain the same permanent identity number independent of the number of physical relocations or transferences the subscriber may experience.

In practicing the present invention, each subscriber is assigned a permanent identity number, signifying his personal identity rather than indicating the directory number of a telephone substation assigned to the subscriber as in prior practice. Thus the permanent identity number does not represent a telephone directory number or telephone substation. Nevertheless, each subscriber having a permanent identity number is contacted by dialing or otherwise signaling that subscriber's personal permanent identity number.

As evidence of the difference in philosophy of telephone communication embodied in the present invention, it should be remembered that a telephone directory number assigned to a subscriber in the past has not been specifically intended to identify the subscriber himself but merely the telephone substation assigned to him for permanent use. This fact is amply borne out by an attempt to communicate with a subscriber who has left the area proximate to his permanently assigned or home telephone substation. Dialing the directory number of the subscriber, in prior art practice, will effect a connection to the telephone substation at the subscriber's home or other location at which the substation, represented by the permanently assigned directory number, is located. Thus, although a connection is made to the telephone substation, the subscriber is unavailable.

In the present embodiment the calling party does not dial the directory number of any particular telephone substation but, instead, dials a permanent identity number unique to a particular telephone subscriber and, through facilities herein explained, is connected to the subscriber at a telephone substation proximate to the called party's physical location. This procedure, of course, obviates the necessity for the calling party to be informed as to the physical whereabouts of the called party.

For example, a patient seeking to reach his doctor may, by merely dialing the permanent identity number of the physician, be automatically connected to him even though the doctor may be at the hospital, at the home of another patient, etc.

The controlling innovation in telephone switching practice involved in the present embodiment is pivoted on the assignment of a unique permanent identity number to each subscriber to identify him personally. Telephone directories distributed for use in conjunction with the instant embodiment will be predicated on a compilation of the permanent identity number of each subscriber in lieu of the conventional listing of telephone directory numbers indicative of particular telephone substations assigned to each subscriber.

The above and other objects of the invention are realized in an illustrative embodiment in which a flexible central storage of all permanent identity numbers is located at a telephone central office. When a calling party dials the permanent identity number of a called subscriber, a connection is effected to a connector translator to register the permanent identity number of the called subscriber. This registered number is compared by a scanning device with each of the permanent identity numbers in the central storage until a match is effected. When the registered number and the scanned permanent identity number in storage coincide, a group of relays is operated in a location code storage. The location code storage includes facilities for storing location code numbers, each of which represents a telephone substation at which a subscriber having a permanent identity number may be currently contacted. Based on the location code of the called subscriber, information is transferred to switching equipment to effect an interconnection between the calling party and the called subscriber, Effective utilization of the instant invention pre-supposes that each subscriber having a permanent identity number will advise the central location code storage in the central office of the location code or telephone number of the substation at which he may be currently contacted.

Thus each permanent identity number in storage in the telephone central office has an associated location code number indicative of a telephone substation at which the subscriber having the permanent identity number may be currently contacted.

Whenever a subscriber having a permanent identity number travels, or otherwise relocates, he may, if he chooses, have all subsequent calls transferred to his new location by modifying the location code number in the central storage associated with his permanent identity number. In practice, this procedure is effected from any substation by the subscriber dialing his own permanent identity number preceded by a directing code (designed to select a trunk in the telephone central office adapted to receive information pertaining to modified location code numbers) and followed by the modified location code number (or directory number of the telephone substation at which the subscriber may be reached).

A change translator in the central office registers the permanent identity number of the calling subscriber and compares the registered number with each of the numbers stored in the central storage of permanent identity numbers until a match is achieved. When the registered number and the stored permanent identity number coincide, equipment is operated to erase the location code number theretofore associated with the stored permanent identity number and to substitute a modified location code number supplied by the calling party. This modified location code number is indicative of a telephone substation at which the calling party may be currently reached.

All subsequent calls to the party who has modified his location code number will be automatically routed to that party at the modified location, i.e., at a telephone substation represented by the modified location directory number.

Subsequent relocations by a subscriber are similarly accompanied by modifications in the location code associated with his permanent identity number prior to each relocation.

A feature of this invention is a central memory storage for permanent identity numbers wherein each number is indicative of a particular telephone subscriber in lieu of a particular telephone substation.

Another feature of this invention is a central memory storage for recording a location code number in association with each permanent identity number wherein the location code numbers represent telephone substations at which subscribers designated by the associated permanent identity number may be currently contacted.

An additional feature of this invention includes connector translator means adapted to register a called permanent identity number and in cooperation with a scanning device to compare said called number with each of the stored permanent identity numbers successively.

Another feature of this invention includes apparatus for conditioning route selection equipment in accordance with the location code number associated with the called permanent identity number.

A further feature of this invention includes equipment for modifying location code numbers associated with the permanent identity numbers in accordance with a relocation of a subscriber to a telephone substation represented by a modified location code number.

A still further feature of this invention includes apparatus for enabling each subscriber to modify the location code number associated with his permanent identity number from any telephone substation by dialing a directing code, followed by his permanent identity number and the modified location code number.

A further feature of this invention includes a location code translator adapted to register each modified location code number before transfer to the location code storage.

A further feature of this invention includes apparatus for automatically erasing location code numbers.

The above objects and features of the invention may be more readily comprehended from an examination of the following detailed description and attached drawing, in which.

*General description*

Figure 1:
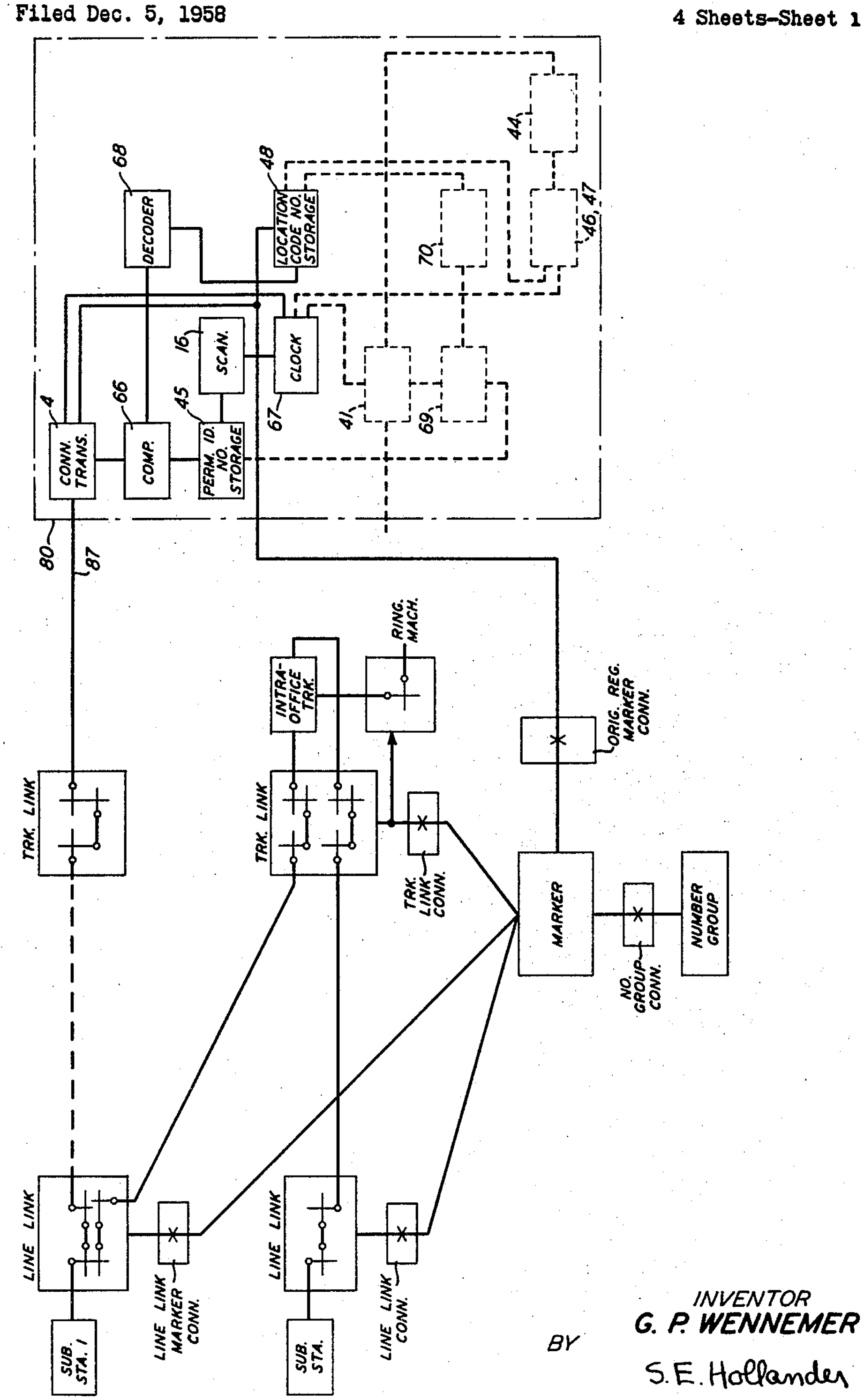
Fig. 1 is an outline diagram of the equipment utilized in an intra-office call in accordance with the present invention.

Referring to Fig. 1, an outline diagram of the equipment involved in an intra-office call is shown. The manner of operation of the equipment illustrated in outline form to the left of line 80 is conventional and well known in the art. For a comprehensive analysis of the operation of this equipment reference may be made to a patent of A. J. Busch, No. 2,585,904 of February 19, 1952.

When a subscriber lifts his handset to place a call, the operation of his line relay (not shown) causes the marker to be seized over the line link marker connector. This seizure informs the marker that the connector translator which, in this embodiment, serves a purpose similar to the originating register of the crossbar telephone system described in the above-referred-to patent, is to be connected to the calling line to record the number about to be dialed.

The marker establishes the location of the calling line on the line link frame and the location of an idle originating register on a trunk link frame, and proceeds to find and close an idle channel between them. The calling line location is now stored in the connector translator by the marker and the marker releases. The connector translator sends dial tone to the calling subscriber and the subscriber dials into the connector translator the called permanent identity number which, it will be assumed, is the number of a subscriber in the same office.

The permanent identity number representing the called subscriber is stored in connector translator 4 which functions to partially energize the windings of a number of relays in the comparator 66. In response to either program or clock pulses from clock 67, scanner 16 sequentially connects each of the groups of relays representing permanent identity numebrs stored in the permanent identity number storage 45 to the comparator relays 66.

When a match is effected between the information stored in relays in the permanent identity number storage 45 and corresponding information stored in comparator 66, the comparator 66 is operated to energize a particular relay in the decoder 68. This relay identifies an associated group of relays in the location code storage 48, which relays represent by the information stored therein the number of a telephone substation at which the subscriber having the called permanent identity number may be contacted.

The information store relays in the location code storage 48 representing the associated telephone substation number are energized and information representing this number is transferred to the marker which is seized at this time by the location code storage via the originating register-marker conenctor. When the marker is connected to the location code number storage, the location storage 48 transmits to the marker the location code number of the called subscriber.

The location of the calling subscriber's line is stored in conventional equipment (not shown) in the connector translator and conveyed to the marker in the manner shown in the above-referred-to patent.

The marker proceeds to seize a trunk link frame having an idle intra-office trunk. At the same time it seizes the number group over the number group connector to determine the location of the called line on a line link frame and seizes the indicated line link frame.

The called line is then connected to the intra-office trunk and the line link frame of the calling line is connected to the other end of the intra-office trunk. After passing ringing information to the trunk over the trunk link connector, the marker releases and the ringing of the called line begins. Ringing is cut off in the conventional maner when the called subscriber answers and conversation may ensue.

Figure 2:
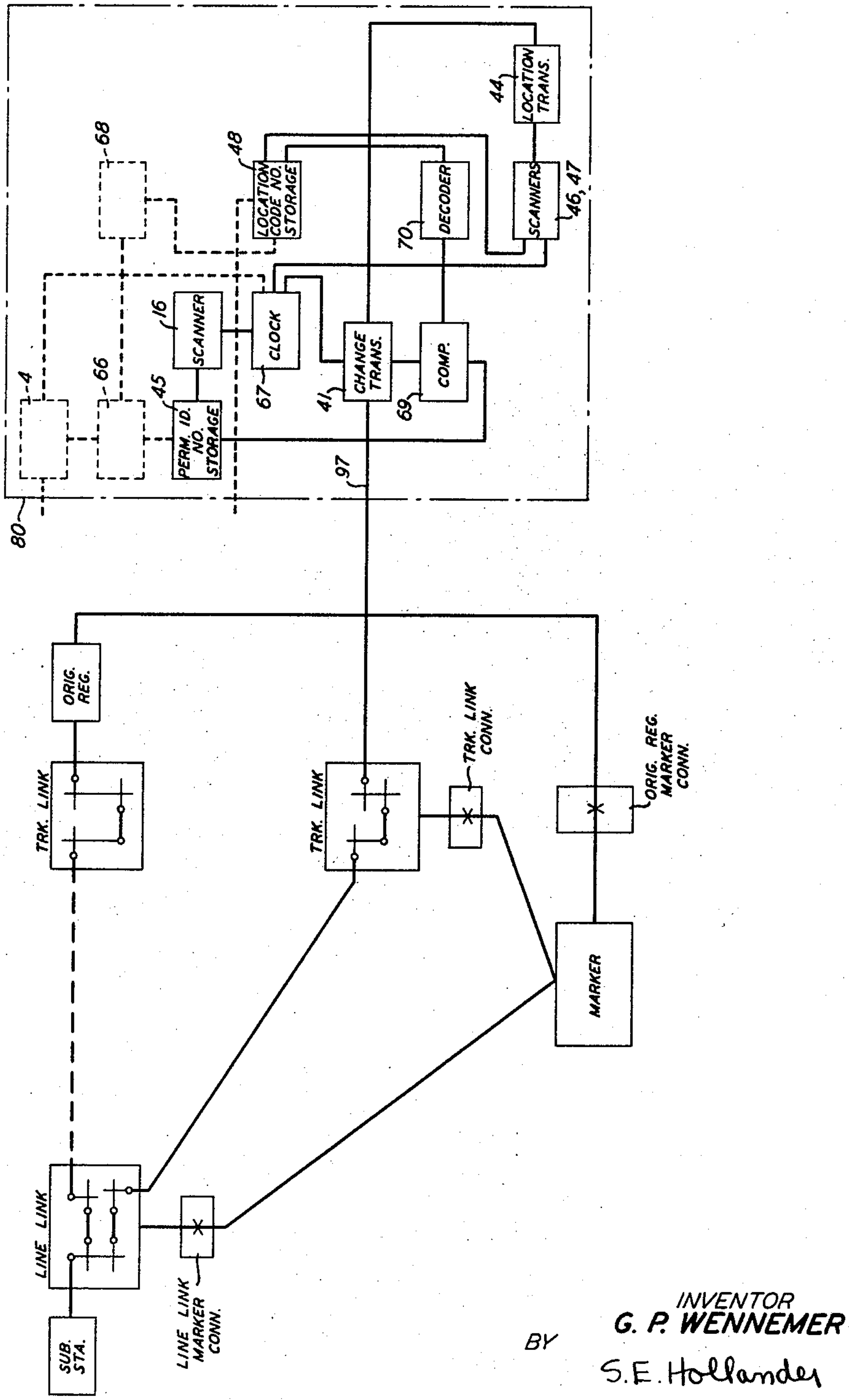
Fig. 2 is an outline diagram of the equipment employed in the modification of a subscriber's location code number.

In instances where a subscriber seeks to change his location code number associated with his permanent identity number to reflect a physical relocation to an area proximate to the station denoted by the modified location code number, a procedure shown in outline form in Fig. 2 is followed.

In Fig. 2 the equipment shown to the left of line 80 is well-known apparatus, the details of which may be found in the above-referred-to patent of A. J. Busch.

In order to modify his location code number, a subscriber dials a directing code which may, for example, be similar to a service code, such as those used for information and long distance in certain areas, i.e., 411 or 211. The directing code is followed by digits representing his own permanent identity number which, in turn, is succeeded by the digits representing the new or modified location code number representing the telephone substation to which the subscriber wants all subsequent calls routed.

When the subscriber takes the receiver from his switchhook to modify his location code number, a line relay is operated which causes the marker to be seized over the line link marker connector. The marker proceeds to identify an idle originating register on a trunk link frame and to find and close an idle set of links and junctors between them. When this has been done, the calling line location is stored in the register and the marker releases and the register sends dial tone to the subscriber. The subscriber now proceeds to dial the directing code, which may illustratively be 511. The originating register records the code digits and seizes a marker. The register transmits to the marker the code digits dialed by the subscriber and the location of the calling subscriber's line.

Recognizing the call as a service code call, the marker establishes a channel between the calling line and a trunk to the change translator 41. The subscriber now receives a second dial tone signal from the change translator 41 and proceeds to dial his own permanent identity number. This number is stored in the change translator 41 and a number of relays in comparator 69 are partially energized to indicate the stored permanent identity number. The subscriber now dials the digits of the new location code number and these digits are steered into the location translator 44.

The condition of the relays in comparator 69 is now compared sequentially with the condition of each of the groups of relays in the permanent identity store 45 by scanner 16 under control of clock 67. When a match is effected, that is, when a particular group of relays in the permanent identity number store, representing the same permanent identity number stored in change translator 41, are matched, comparator 69 is operated which, in turn, operates decoder 70 to erase the information in the group of relays in the location code storage 48 representing the previous permanent identity number.

The new or modified location code number stored in location translator 44 is now delivered through scanners 46 and 47 to operate relays in the location code storage in accordance with the new or modified location code number.

When the subscriber replaces his receiver, the equipment is released and any subsequent call made to his permanent identity number will be transferred to the substation represented by his modified location code number in the manner set forth in the description of Fig. 1.

It will be seen that only a portion of the equipment to the right of line 80 is utilized in executing a particular function. Only those portions of the equipment which do participate in completing a given procedure are shown in solid outline, the remainder in dotted outline.

*Description of major components*

Before undertaking a detailed description of the operation of the invention, an analysis of the major component elements will be useful as an aid in understanding the invention.

Figure 3:
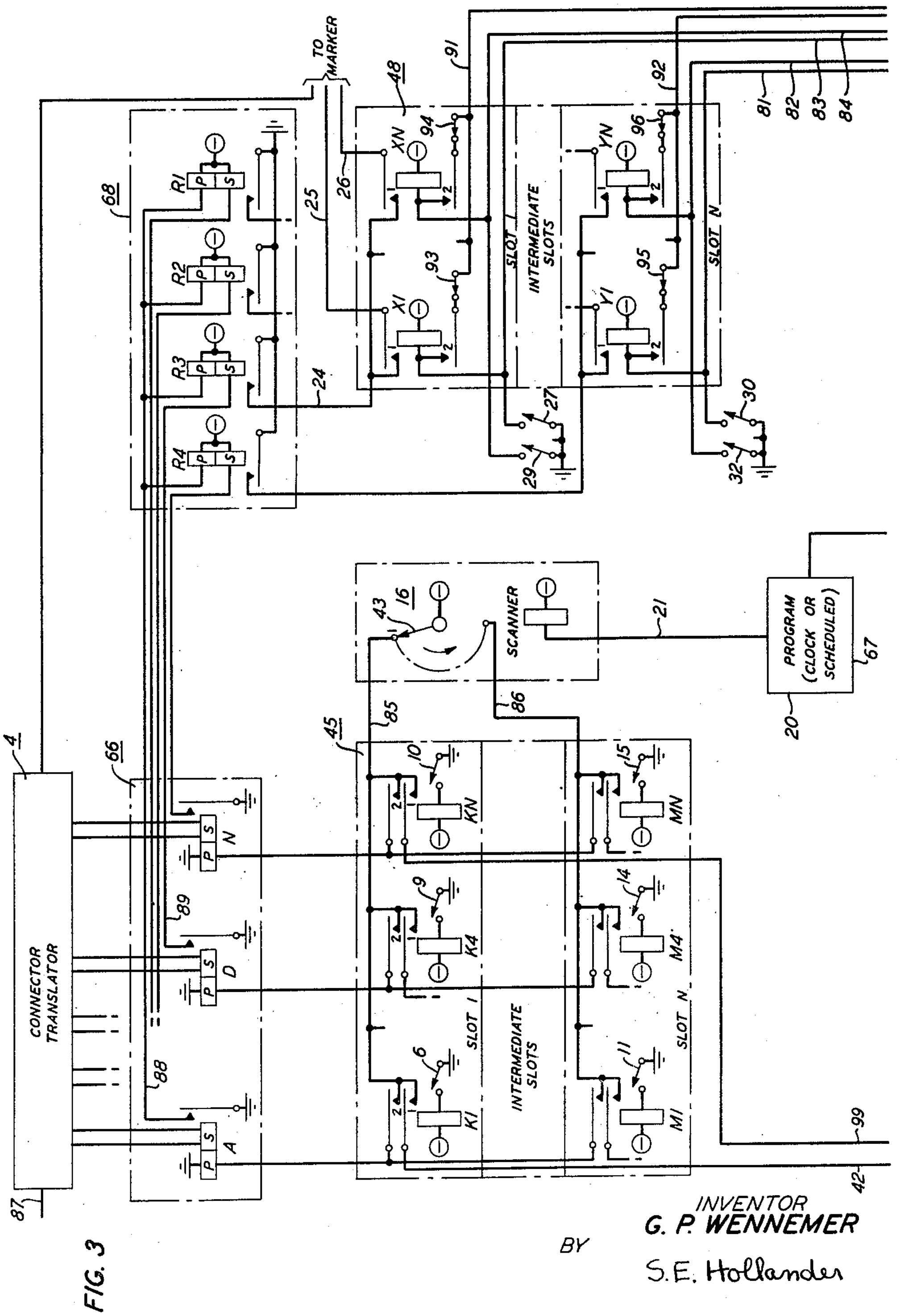
Figs. 3 and 4 show details of the structure and interconnections between the equipment indicated in outline form in Figs. 1 and 2.

The connector translator 4 of Fig. 3 is shown symbolically and includes well-known apparatus for operating a given number of a larger possible number of relays in response to dialed information. Illustratively, connector translator 4 may be adapted to operate two out of five relays of comparator 66 (of which only three are shown) in a manner described in an article entitled "The Originating Dial Pulse Register Circuit for the No. 5 Crossbar System" by J. W. Dehn in the Bell Laboratories Record of January 1950, at page 7.

For purposes of simplification, the connector translator 4 has been shown as operating two out of five relays corresponding, for example, to one of the dialed digits of the permanent identity number on a two-out-of-five code basis. (For a detailed explanation of the two-out-of-five code, reference may be made to "The Design of Switching Circuits" by Keister et al., 1951, at page 280.)

It is understood, however, that a greater number of digits will illustratively comprise the called permanent identity number in which instance additional groups of five relays each (not shown) similar to relays A—N will be utilized to register a two-out-of-five translation of the remaining dialed digits in the manner shown in the above-referred-to article by Dehn.

Operating in conjunction with the connector translator 4 and comparator 66 is the permanent identity number relay storage 45. This storage arrangement is, in effect, a complete directory of assigned permanent identity numbers. Illustratively, the storage takes place in groups of relays comprising slots. For example, relays K1—KN comprise slot 1 and relays M1—MN comprise slot N, a particular slot being assigned to each permanent identity number. Here again, as in the case of relays A—N, a single group of five relays (of which only three are shown) comprises each slot, it being understood, however, that a single slot may contain additional groups of five relays to register the required number of digits. For example, slot No. 1 may contain three additional groups of five relays each, similar in arrangement and configuration to relays K1—KN for storage of three additional digits of a four-digit permanent identity number, the first digit being stored in relays K1—KN.

Stepping switch scanner 16 is operated under control of a program source to sequentially connect to each of the slots in turn over arm 43 for purposes herein explained.

The program source 20 may itself illustratively include a clock timer or relay timer for generating a sequential series of advance pulses in a well-known manner.

Location code number storage 48 includes a complete list of location code numbers individually associated with permanent identity numbers in similarly numbered slots. The location code numbers designate telephone substations at which the subscriber having the associated permanent identity number may be contacted. The arrangement of the location code storage is substantially similar to that of the permanent identity number storage. Five relays (of which only two are shown) are included in each slot to represent storage of information in the two-out-of-five code referred to above, representing one digit of a telephone substation number.

Additional groups of five relays each (not shown) may be utilized to represent the remaining digits of the location code number (telephone substation number at which a subscriber having the associated permanent identity number may be currently contacted).

The relays of the permanent identity number storage and the location code number storage are energized in a manner hereinafter set forth to respectively indicate a permanent identity number and specific location code at which a particular subscriber may be summoned.

For example, the subscriber having a permanent identity number stored in slot 1 of the permanent identity number storage 45 may be contacted at the corresponding location code number in slot 1 of the location code number storage 48 representing the number of the substation at which he may be currently reached.

Figure 4:
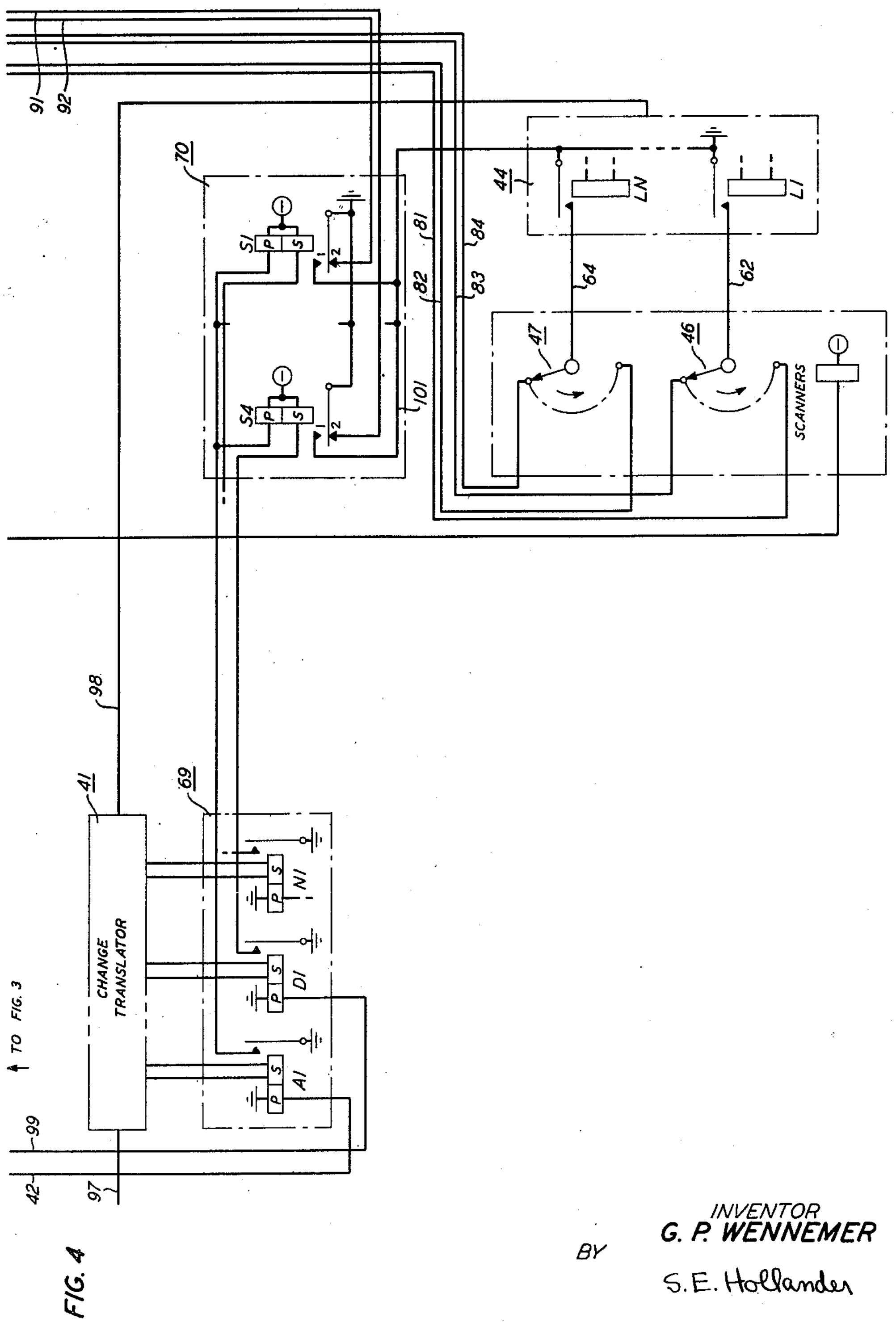

Stepping switches 46 and 47 of Fig. 4 are adapted to operate in synchronism with switch 16 of Fig. 3 under control of the program source 20. The arms of switches 46 and 47 are sequentially connected to each of the slots of the location code number storage 48 over conductors 81—84, etc. in time synchronism with the connection of arm 43 of switch 16 to the correspondingly numbered slots of permanent identity number storage 45 over conductors 85, 86, etc.

Change translator 41, shown in outline form, is substantially similar in operation to connector translator 4 and includes equipment for operating two out of five relays in response to information supplied by subscribers seeking to modify their location code numbers.

Location translator 44 is adapted to store information under control of dialed impulses, also in a manner similar to the connector translator 4.

Decoders 68 and 70 of Figs. 3 and 4, respectively, comprise relays R1—R4, S1—S4, etc. which are adapted to operate when both their upper and lower windings are simultaneously energized thereby performing combinational logic for purposes of completing the connection.

*Detailed description intra-office call*

For illustrative purposes typical operations of the system will now be described in detail. It will be assumed that the permanent identity number of a called party sought to be contacted is 4567. This number, which would appear in a published directory list which is compiled of all permanent identity numbers, is dialed by a subscriber from substation 1 who seeks to reach the called party represented by identity number 4567. The dialed intelligence appears on input conductor 87 to connector translator 4 of Fig. 3 in the manner described above for Fig. 1, and is stored in translator 4.

Information delivered to the connector translator 4 from substation 1 is in conventional digital pulse form representing digits 4567. These pulses are effective within the translator in a well-known manner to energize selected secondary windings S of relays A—N. For a detailed description of the manner in which the digital pulses may be operated upon to energize the secondary windings S of two of the relays A—N, reference may be made to the above-referred-to article by J. W. Dehn.

Relays A—N are designed to operate only when both the primary winding P and secondary winding S thereof are simultaneously energized.

It will be assumed that relays A and D are energized over their secondary windings to represent the first digit 4 of identity number 4567 in the two-out-of-five code in the manner set forth in the above-referred-to publication by Dehn. Similarly, appropriate relays A—N in similar groups of five relays each (not shown), representing each of the remaining digits 5, 6 and 7 will be energized to represent the called permanent identity number.

All of the listed permanent identity numbers are stored in relay units or slots similar to that shown for relays K1—KN and M1—MN. These relays are initially operated in any desirable manner to store information corresponding to a particular permanent identity number. Symbolically, the operation of relays K1—KN and M1—MN has been shown as manual through the actuation of switches 6, 9, 10, 11, 14 and 15.

It will be assumed that slot 1 has been conditioned to register the first of digits 4567 by closing switches 6 and 9, respectively, to energize relays K1 and K4 over obvious paths. Similar groups of five relays each in slot 1 (not shown) have been operated to register the remaining digits 5, 6 and 7. When arm 43 of stepping switch 16 connects to conductor 85 at the No. 1 contacts of switch 16, a further circuit may be traced through the No. 2 contacts of relays K1 and K4 now closed to energize primary windings P of relays A and D thereby operating said relays.

It will be noted that stepping switch 16 sequentially advances arm 43 to connect to each of the slots of the permanent identity number relay storage over conductors 85, 86, etc. under control of program source 20 over lead 21.

A further circuit may now be traced from the contacts of relays A and D over conductors 88 and 89, respectively, to the primary and secondary windings P and S of relay R3 of decoder 68 to operate said relay. Although other relays R1, R2, etc. are partially energized over one of their windings, these relays do not operate since partial energization of the relay through a single winding is insufficient to operate the relay as described above for relays A—N of comparator 66.

The operation of relay R3 extends a path to the location code storage 48 over the contacts of relay R3, conductor 24, and the operated closed contacts of relays X1—XN of the location code number storage 48. Although only one group of relays X1—XN is shown, it is understood that similar groups of relays for the remaining digits of the telephone number are utilized in slot 1 of location storage 48 to represent the telephone substation at which the subscriber having permanent identity number 4567 may be contacted.

It is assumed that relays X1—XN have been previously operated, as explained herein, in slot No. 1 of location code number storage 48, to represent the first digit of the location code number, e.g., 3333. A path may be traced from the contacts of relay R3, conductor 24, No. 1 contacts of relays X1—XN over conductors 25 and 26 to the marker. This information, together with similar information from the other relays (not shown) in slot 1 and information representing the location of the calling line on the line link frame from connector translator 4 over conductor 90 is utilized by the marker to close the appropriate switches to establish a connection to the called subscriber at the telephone number represented in slot 1 of the location code storage, e.g., telephone number 3333, as described for Fig. 1.

Although an intra-office call has been described as illustrative, it is understood that other types of calls, including inter-office calls, may be completed in a similar manner. In the latter type of call a sender would be utilized in the convetnional manner to transmit the location code number information to the desired office in a manner described in the above-referred-to patent of Busch.

*Manual storage and erasure of location code number information*

Relays X1—XN and Y1—YN in the location code number storage 48 of Fig. 3 may be selectively actuated in accordance with a two-out-of-five code representing the first digit of the telephone number of a telephone at which a subscriber may be currently contacted. Thus, by momentarily closing switches 27, 29, etc. and 30, 32, etc. selected X- and Y-relays may be operated. Relays X1—XN and Y1—YN lock operated over their No. 2 contacts, switches 93 and 94, conductors 91 and 92, and the contacts of relays S1 and S4 to ground.

It is understood that additional groups of relays (not shown) are operated in slot 1 of storage 48 to represent the remaining digits of the telephone number at which the subscriber whose permanent identity number is registered in slot 1 of storage 45 may be contacted.

By momentarily opening switch 93, 94, 95 and 96 the associated relays will be de-energized thus manually erasing the information previously stored therein.

*Automatic modification of location code numbers*

To change a location code number associated with his premanent identity number, a subscriber dials a directing code from any substation to reach trunk 97 as explained above for Fig. 2.

On reception of a second dial tone from translator 41 of Fig. 4 the subscriber proceeds to dial his own permanent identity number into change translator 41 of Fig. 4. In accordance with the digits registered in change translator 41 a number of relays A1—N1 in comparator 69 are partially energized over their secondary windings in a manner similar to that shown for connector translator 4 of Fig. 3.

If it is assumed, for illustrative purposes, that the the subscriber, who is identified by permanent identity number 4567, desires to transfer all subsequent calls to a different or modified telephone substation, for example telephone substation 5454, and proceeds to dial in the manner described above, relays A1 and D1 of Fig. 3 will be partially energized in the two-out-of-five code to indicate the first digit 4 of the permanent identity number. The remaining digits 567 of the permanent identity number stored in change translator 41 partially energize additional groups of five relays each (not shown) similar to relays A1—N1.

When the change translator 41 has stored all of the permanent identity number digits, the remaining digits are steered into location translator 44 over trunk 98 which includes illustratively four groups of five relays each, although only one group of two relays L1 and LN is shown. Relays L1—LN are appropriately operated to register the first digit 5 of the new location code number of telephone substation number.

The remaining three groups of relays, not shown, are similarly energized to register the remaining digits of the location code number 454 in a well-known manner similar to that shown for the operation of the originating register in the above-referred-to patent.

Thus it is seen that the dialing of the directing code, which may illustratively be 511, effects a connection to the change translator 41 as described for Fig. 2. After dialing the directing code to reach the change translator 41 of Fig. 4, the following group of digits 4567 dialed by the subscriber constituting his own permanent identity number is registered in change translator 41. The remaining digits designating the new or modified location code number are stored in a similar manner in location translator 44 in Fig. 4.

A comparison is now effected between the condition of the contacts of the relays of change translator 41 and the No. 1 contacts of the relays of storage 45. When arm 43 of selecting switch 16 engages its No. 1 contacts, a path is completed to the primary windings P of relays A1 and D1. This path may be traced from negative battery, arm 43, conductor 85, No. 1 contacts of relays K1—KN, conductors 42 and 99 to the primary windings of relays A1 and D1, respectively. Since the secondary windings of relays A1 and D1 were previously energized from change translator 41, the selected relays A1 and D1 are now operated.

Relay S4 operates in consequence of the operation of relays A1 and D1 over a path which may be traced for the primary winding of relay S4 from the contacts of relay A1 and for the secondary winding of relay S4 from the contacts of relay D1.

The operation of relay S4 and the opening of the No. 2 contacts thereof results in the release of relays X1—XN to erase the stored information in slot 1 of the location code number storage 48 which represented the previous location code number of the subscriber having permanent identity number 4567. The locking path for relays X1—XN, previously traced over conductor 91, is now opened at the normally closed contacts of relay S4. Relays X1—XN and the remaining relays in slot 1 (not shown) are thereby released.

At this time the new location code number, which is stored in location translator 44, is transferred to relays X1—XN and associated groups of relays in slot 1 of the location code number storage. Since, as previously discussed, stepping switches 46 and 47 operate in synchronism with stepping switch 16, a number of paths are available for energizing relays X1—XN of storage 48 in accordance with the new location code number first digit. Relays L1—LN were previously operated in accordance with a two-out-of-five translation of the first decimal digit 5 of the new location code number. In consequence, a path may be traced from the No. 1 contacts of relay S4, conductor 101, contacts of relays L1—LN, conductors 62, 64, etc., switches 46 and 47, conductors 83, 84, etc., through the windings of relays X1—XN to negative battery. Relays X1 and XN are operated and lock to ground over their No. 2 contacts and the No. 2 contacts of relay S4 over the path previously traced to represent the first digit 5 of the new location code 5454.

A similar path may be traced from the contacts of relay LN, conductor 64, arm of switch 47, windings of relay XN to negative battery. Relay XN locks operated over the path previously traced for relay X1. In a similar manner, the remaining digits 454 of the new location code number 5454 are stored in the additional groups of relays (not shown) in slot 1 of the location code number storage 48.

When the subscriber has modified his location code number to the desired new number and disconnects, the equipment returns to normal as described for Fig. 2.

Any subsequent calls directed to the subscriber having permanent identity number 4567 will now be routed to the called subscriber's new location code number or telephone station at which he may be contacted, 5454, in a manner similar to that described above for effecting a connection to the telephone substation 3333 which was the previous location code number.

It is understood that the above embodiment is merely exemplary and that various modifications may be made by those skilled in the art without departing from the spirit and scope of the invention. Moreover although telephone substations are referred to as illustrative it is understood that other types of substations including telegraph substations, etc., may be utilized with minor appropriate modifications to the configuration illustrated.

What is claimed is:

1. A telephone automatic switching system including a plurality of telephone substations, storage means for storing a first and second group of binary indices respectively designating a subscriber permanent identity number and a corresponding telephone substation at which said subscriber may be summoned, and means connectible to said storage means and controlled by signals from any of said substations for replacing said second group of binary indices with a modified group of binary indices designating another telephone substation in accordance with a change in physical location of said subscriber to an area proximate to said other telephone substation.

2. A telephone automatic switching system including a plurality of telephone substations, storage means for storing a first and second group of binary indices respectively designating a subscriber permanent identity number and a corresponding telephone substation at which said subscriber may be contacted, means connected to said storage means and controlled by signals from any of said substations for replacing said second group of binary indices with a modified group of binary indices designating another telephone substation in accordance with a change in physical location of said subscriber to said other telephone substation, and means connectible to said storage means and responsive to signals from a telephone substation indicative of said first group of indices for actuating said storage means to produce output signals representative of said second group of indices.

3. A telephone automatic switching system including a plurality of telephone substations, storage means for storing a first and second group of binary indices designating a subscriber permanent identify number and a corresponding telephone substation at which said subscriber may be summoned, means connectable to said storage means and controlled by signals from any of said substations for replacing said second group of binary indices with a modified group of binary indices designating another telephone substation in accordance with a change in physical location of said subscriber to an area proximate to said other telephone substation, means connectable to said storage means and responsive to signals indicative of said first group of indices from a calling one of said telephone substations for governing said storage means to produce output signals representative of said modified group of indices, and means connectable to said storage means and responsive to said output signals for interconnecting said calling substation and said substation represented by said modified group of indices.

4. An automatic telephone switching system including a plurality of telephone substations, a central office at which said substations are terminated, relay storage means at said central office including a permanent identity number storage for recording identity numbers representing telephone subscribers and a location code number storage means for recording related telephone numbers representing telephone substations at which each of said subscribers having a permanent identity number recorded in said permanent identity number storage may be reached, said permanent identity numbers and related telephone numbers being stored in individually associated relay groups, and means connected to said relay storage means and controlled by signals from said substations for modifying said numbers in said relay groups in said location code number storage associated with said permanent identity numbers in accordance with a change in physical location of the subscribers having said permanent identity numbers.

5. An automatic telephone switching system including a plurality of telephone substations, a central office at which said substations are terminated, relay storage means at said central office including a permanent identity number storage for recording identity numbers representing telephone subscribers, location code number storage means associated with said permanent identity storage for recording related telephone numbers representing telephone substations at which each of said subscribers having a permanent identity number recorded in said permanent identity number storage may be reached, means connected to said relay storage means and controlled by signals from one of said substations for modifying said numbers in said location code number storage associated with said permanent identity numbers in accordance with a change in physical location of the subscribers having said permanent identity numbers, said permanent identify numbers and related telephone numbers being stored in individually associated relay groups, and additional means connectable to said relay storage means and responsive to signals from a calling telephone substation indicative of a particular permanent identity number for actuating said storage means to produce output signals representative of the telephone number related to said particular permanent identity number.

6. An automatic telephone switching system including a plurality of telephone substations, a central office at which said substations are terminated, relay storage means at said central office including a permanent identity number storage for recording identity numbers representing telephone subscribers, location code number storage means associated with said permanent identity storage for recording telephone numbers representing telephone substations at which each of said subscribers having a permanent identity number recorded in said permanent identity number storage may be reached, means connected to said relay storage means and controlled by signals from any of said substations for modifying said numbers in said location code number storage means in accordance with changes in physical location of the subscribers having permanent identity numbers, said permanent identity numbers and related telephone number being stored in individually associated relay groups, additional means connectable to said storage means and responsive to signals from a calling telephone substation indicative of a particular permanent identity number for actuating said storage means to produce output signals representative of said telephone number associated with said particular permanent identity number, and means connectable to said storage means and responsive to said output signals for interconnecting said calling substation and said substation represented by said related telephone number.

7. An automatic telephone switching system including a plurality of telephone substations, a central office at which said substations are terminated, connector translator means at said central office connectable to a calling one of said substations for registering the permanent identity number of a called party in response to control signals from said calling substation, comparator means connected to said connector translator and responsive to the registration therein of said called permanent identity number for indicating said number, a permanent identity number storage including a plurality of groups of storage devices each settable to designate a permanent identity number representing a subscriber, scanning means for connecting each of said groups of storage devices to said comparator means successively, means responsive to the matching of said permanent identity number in storage with said permanent identity number of said called party indicated in said comparator means for operating said comparator means, location code number storage means including a plurality of groups of storage devices each settable to designate telephone substations and individually associated with said groups of storage devices in said permanent identity storage, decoder means, means responsive to the operation of said comparator means for operating said decoder means, and means responsive to the operation of said decoder means and the setting of said storage devices in said location code number storage to produce output signals indicative of said telephone substation represented by said location code number associated with said permanent identity number of said called party.

8. An automatic telephone switching system including a plurality of telephone substations, a central office at which said substations are terminated, a permanent identity number storage at said central office including a plurality of groups of storage elements, each group individually settable to represent a particular permanent identity number designating a telephone subscriber, connector translator means in said central office responsive to control signals from a calling one of said substations for registering a called permanent identity number, comparator storage elements responsive to the registration of said called permanent identity number to indicate said number, scanning means for sequentially connecting each of said groups of storage elements in said permanent identity storage to said comparator storage elements, means effective on a matching condition between said called permanent identity number indicated in said comparator storage elements and a particular group of storage elements in said permanent identity storage representing the same number for operating said comparator storage elements, a location code number storage including a plurality of groups of storage elements individually associated with said groups of storage elements in said permanent identity number storage and individually settable in accordance with the numbers of telephone substations at which said subscribers having permanent identity numbers may be contacted, decoder means responsive to the operation of said comparator storage elements and to the setting of said group of storage elements in said location code number storage associated with said particular group of storage elements for producing output signals indicative of the number of a particular telephone substation, and means responsive to said output signals for interconnecting said calling substation and said particular substation.

9. An automatic telephone switching system including a plurality of telephone substations, a central office at which said substations are terminated, a permanent identity number storage at said central office including a first plurality of groups of relays, each group individually settable to represent a particular permanent identity number designating a telephone subscriber, connector translator means in said central office responsive to control signals from a calling one of said substations for registering a called permanent identity number, comparator relays responsive to the registeration of said called permanent identity number to indicate said number, scanning means for sequentially examining each of said groups of relays in said permanent identity storage and connecting said groups of relays to said comparator relays, means effective on a matching condition between said comparator relays and a particular group of relays in said permanent identity storage representing the called permanent identity number for operating said comparator relays, a location code number storage including a second plurality of groups of relays individually settable in accordance with the numbers of telephone substations at which said subscribers having permanent identity numbers may be contacted, each of said groups of relays in said first group having an individually associated group of relays in said second group, decoder means responsive to the operation of said first comparator relays and to the setting of said group of relays in said location code number storage associated with said group of relays designating said permanent identity number for producing output signals indicative of the number of a particular telephone substation, and means connectable to said permanent identity and location code storage and responsive to signals from one of said telephone substations indicative of a particular permanent identity number and a modified location code number to reset said group of relays in said location code number storage associated with said particular permanent identity number to represent said modified location code number.

10. An automatic telephone switching system including a plurality of telephone substations, a central office at which said substations are terminated, a permanent identity number storage at said central office including a first plurality of groups of bistable devices, each group individually settable to represent a particular permanent identity number designating a telephone subscriber, connector translator means in said central office responsive to control signals from a calling one of said substations for registering a called permanent identity number, comparator bistable devices responsive to the registration of said called permanent identity number to indicate said number, timing means, stepping switch means under control of said timing means for sequentially connecting each of said groups of bistable devices in said permanent identity storage to said comparator bistable devices, means effective on a matching condition between said comparator bistable devices and a particular group of bistable devices in said permanent identity storage representing said called premanent identity number for operating said comparator bistable devices, a location code number storage including a second plurality of groups of bistable devices individually settable in accordance with the numbers of telephone substations at which said subscribers having permanent identity numbers may be contacted, each of said groups of bistable devices in said first plurality of groups being individually associated with a group of bistable devices in said second plurality of groups, decoder means responsive to the operation of said comparator bistable devices and to the setting of said group of bistable devices in said location code number storage related to the group of bistable devices in said permanent identity number storage representing said called permanent identity number for producing output signals indicative of the number of a particular telephone substation at which said subscriber having said called permanent identity number may be contacted, and additional means in said central office responsive to said output signals from said location code number storage for interconnecting said calling substation and said particular telephone substation associated with said called permanent identity number.

11. An automatic telephone switching system including a plurality of telephone substations, a central office at which said substations are terminated, a permanent identity nuber storage at said central office including a first plurality of groups of storage devices, each group individually settable to represent a particular permanent identity number designating a telephone subscriber, connector translator means in said central office responsive to control signals from a calling one of said substations for registering a called permanent identity number, comparator storage devices connected to said connector translator and responsive to the registration of said called permanent identity number to indicate said number, timing means, stepping switch means under control of said timing means for sequentially connecting each of said groups of storage devices in said permanent identity storage to said comparator storage devices, means effective on a matching condition between said comparator storage devices and a particular group of storage devices in said permanent identity storage representing said called permanent identity number for operating said comparator storage devices, a location code number storage including a second plurality of groups of storage devices individually settable in accordance with the numbers of telephone substations at which said subscribers having permanent identity numbers may be contacted, each of said storage devices in said first plurality of groups being individually associated with a group of storage devices in said second plurality of groups, decoder storage devices responsive to the operation of said comparator storage devices and to the setting of said group of storage devices in said location code number storage associated with said group of storage devices in said permanent identity storage representing said called permanent identity number for producing output signals indicative of the number of a particular telephone substation, additional means in said central office responsive to said output signals from said location code number storage for interconnecting said calling telephone substation and said particular telephone substation, and means in said central office responsive to signals from any of said telephone substations indicative of a certain permanent identity number and a modified location code for resetting said group of storage devices in said location code number storage associated with said group of storage devices designating said certain permanent identity number to represent said modified location code number.

12. An automatic telephone switching system including a plurality of telephone substations, a central office at which said substations are terminated, a permanent identity number storage at said central office including a first plurality of groups of relays, each group individually settable to represent a particular permanent identity number designating a telephone subscriber, connector translator means in said central office responsive to control signals from a calling one of said substations for registering a called permanent identity number, first comparator relays responsive to the registration of said called permanent identity number to indicate said number, timing means, stepping switch scanner means governed by said timing means for connecting each of said groups of relays in said permanent identity storage to said first comparator relays, means effective on a matching condition between said first comparator relays and a particular group of relays in said permanent identity storage for operating said first comparator relays, a location code number storage including a second plurality of groups of relays individually settable in accordance with the numbers of telephone substations at which said subscribers having permanent identity numbers may be contacted, each of said groups in said first and second plurality of groups of relays respectively representing a permanent identity number and associated location code number, first decoder means responsive to the operation of said first comparator relays and to the setting of said group of relays in said location code number storage associated with said called permanent identity number for producing output signals indicative of the number of a particular telephone substation, a change translator connectable to one of said substations and responsive to signals from said one substation representing a calling permanent identity number having an associated location code number requiring modification for registering said calling permanent identity number, second comparator relays responsive to the registration of said calling permanent identity number in said change translator to indicate said number, a location translator responsive to signals from said one telephone substation indicative of said modified location code number for registering said modified number, said scanner means being operative to interconnect said groups of relays in said permanent identity number storage sequentially to said second comparator relays, means responsive to a matching condition between said second comparator relays and a group of relays in said permanent identity number storage for operating said second comparator relays, and second decoder means responsive to the operation of said second comparator relays for resetting said location code number relays in said location code number storage associated with said calling permanent identity number.

13. An automatic telephone switching system including a plurality of telephone substations, a central office at which said substations are terminated, a permanent identity number storage at said central office including a first plurality of groups of relays, each group individually settable to represent a particular permanent identity number designating a telephone subscriber, connector translator means in said central office responsive to control signals from a calling one of said substations for registering a called permanent identity number, first comparator relays responsive to the registration of said called permanent identity number to indicate said number, scanning means for sequentially connecting each of said groups of relays in said permanent identity storage to said first comparator relays, means effective on a matching condition between said first comparator relays and a group of relays in said permanent identity storage representing said called permanent identity number for operating said first comparator relays, a location code number storage including a second plurality of groups of relays individually settable in accordance with the numbers of telephone substations at which said subscribers having permanent identity numbers may be contacted, said groups in said first and second plurality of groups of relays respectively representing a permanent identity number and associated location code number, decoder means responsive to the operation of said first comparator relays and to the setting of said group of relays in said location code number storage associated with said called permanent identity number for producing output signals indicative of the number of said telephone substation, a change translator connectable to one of said substations and responsive to signals from said substation representing a calling permanent identity number having an associated location code number requiring modification for registering said calling permanent identity number, second comparator relays responsive to the registration of said calling permanent identity number in said change translator to indicate said number, a location translator responsive to signals from said one telephone substation indicative of said modified location code number for registering said modified number, said scanning means being additionally operative to interconnect said groups of relays in said permanent identity number storage sequentially to said second comparator relays, means responsive to a matching condition between said second comparator relays and a group of relays in said permanent identity number storage representing said calling permanent identity number for operating said second comparator relays, second decoder means responsive to the operation of said second comparator relays for deactivating said relays in said location code number storage associated with said calling permanent identity number to erase said location code number, and means responsive to said matching of said second comparator relays and said group of relays in said permanent identity storage for conditioning said location translator to reset said relays in said location code number storage associated with said calling permanent identity number to said modified location code number.

14. An automatic telephone switching system including a plurality of telephone substations, a central office at which said substations are terminated, a permanent identity number storage at said central office including a first plurality of groups of relays, each group individually settable to represent a particular permanent identity number designating a telephone subscriber, connector translator means in said central office responsive to control signals from a calling one of said substations for registering a called permanent identity number, first comparator relays responsive to the registration of said called permanent identity number to indicate said number, scanning means for sequentially connecting each of said groups of relays in said permanent identity storage to said first comparator relays, means effective on a matching condition between said first comparator relays and a particular group of relays in said permanent identity storage representing said called permanent identity number for operating said first comparator relays, a location code number storage including a plurality of groups of relays individually settable in accordance with the numbers of telephone substations at which said subscribers having permanent identity numbers may be contacted, said groups in said first and second plurality of groups of relays respectively representing a permanent identity number and associated location code number, first decoder means responsive to the operation of said first comparator relays and to the setting of said group of relays in said location code number storage associated with said called permanent identity number for producing output signals indicative of the number of a particular telephone substation, means responsive to said output signals from said location code number storage for interconnecting said calling substation and said particular telephone substation, a change translator connectable to one of said substations and responsive to signals from said substation representing a calling permanent identity number having an associated location code number requiring modification for registering said calling permanent identity number, second comparator relays responsive to the registration of said permanent identity number in said change translator to indicate said number, a location translator responsive to signals from said one telephone substation indicative of said modified location code number for registering said modified location code number, said scanning means being additionally operative to interconnect said groups of relays in said permanent identity number storage sequentially to said second comparator relays, means responsive to a matching condition between said second comparator relays and a group of relays in said permanent identity number storage representing said calling permanent identity number for operating said second comparator relays, second decoder means responsive to the operation of said second comparator relays for deenergizing said group of relays in said location code number storage associated with said calling permanent identity number, and additional means responsive to said matching condition for conditioning said location translator to reset said relays in said location code number storage associated with said calling permanent identity number to said modified location code number.

References Cited in the file of this patent

UNITED STATES PATENTS

| | | |
|---|---|---|
| 1,759,190 | Friendly | May 20, 1930 |
| 1,760,823 | Friendly | May 27, 1930 |
| 2,274,760 | Wicks | Mar. 3, 1942 |
| 2,341,693 | Clay | Feb. 15, 1944 |
| 2,833,863 | Kosten | May 6, 1958 |